United States Patent
Gill

(10) Patent No.: US 7,268,980 B2
(45) Date of Patent: Sep. 11, 2007

(54) MAGNETIC HEAD HAVING SELF-PINNED CPP SENSOR WITH MULTILAYER PINNED LAYER

(75) Inventor: Hardayal Singh Gill, Palo Alto, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 358 days.

(21) Appl. No.: 10/777,538

(22) Filed: Feb. 11, 2004

(65) Prior Publication Data

US 2005/0174703 A1    Aug. 11, 2005

(51) Int. Cl.
    G11B 5/00    (2006.01)
(52) U.S. Cl. ................................. 360/324.11
(58) Field of Classification Search ............ 360/324.1, 360/324.11, 324.12, 324.2
    See application file for complete search history.

(56) References Cited

U.S. PATENT DOCUMENTS

| | | | | |
|---|---|---|---|---|
| 6,519,124 | B1 | 2/2003 | Redon et al. ............ | 360/324.2 |
| 6,611,405 | B1 | 8/2003 | Inomata et al. .......... | 360/324.2 |
| 6,909,583 | B2* | 6/2005 | Li et al. .................. | 360/324.1 |
| 7,019,949 | B2* | 3/2006 | Freitag et al. .......... | 360/324.11 |
| 2002/0097533 | A1 | 7/2002 | Funayama et al. ....... | 360/324.1 |
| 2002/0135948 | A1 | 9/2002 | Funayama et al. ....... | 360/324.1 |
| 2003/0026049 | A1 | 2/2003 | Gill ....................... | 360/324.12 |
| 2005/0122635 | A1* | 6/2005 | Freitag et al. ......... | 360/324.11 |

FOREIGN PATENT DOCUMENTS

WO        WO 01/99099 A2    12/2001

OTHER PUBLICATIONS

"Angular Sensor Using TMR Junctions with an AAF (Artificial antiferromagnet) Reference Electrode and IMproved Thermal Stability", Manfred Ruehrig, Robert Seidel, Ludwig Baer, Michael Vieth, Guenter Rupp, Joachim Wecker, Intermag Europe 2002, AV Magnetoelectronic Devices and Spin Torque.
"Thermal Stability of Pinned Layer in PtMn-Based Synthetic Spin-Valve",, Nagai, H.; Ueno, R.; Hikami, F.; Sawasaki, T.; Tanoue, S., IEEE Transactions on Magnetics, vol. 35, Issue: 5, Sep. 1999 pp. 2964-2966.

* cited by examiner

*Primary Examiner*—Hoa T. Nguyen
*Assistant Examiner*—Mark Blouin
(74) *Attorney, Agent, or Firm*—Larry B. Guernsey; Intellectual Property Law Offices

(57) ABSTRACT

A magnetic head has a read sensor including a free layer, a spacer layer and a number of self-pinned layers. These self-pinned layers include interleaved layers of ferromagnetic material and non-magnetic metal. The self-pinned layers are pinned through magnetostrictive anisotropy, and preferably have a net magnetic moment which is approximately zero.

21 Claims, 4 Drawing Sheets

MAGNETIC HEAD HAVING SELF-PINNED CPP SENSOR WITH MULTILAYER PINNED LAYER

BACKGROUND OF THE INVENTION

1. Field of the Invention

The present invention relates generally to magnetoresistive sensors for magnetic read heads for magnetic data storage mediums, and more particularly to a magnetoresistive sensor using pinned layers which are self-pinned due to magnetostrictive anisotropy effects.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" onto which the read/write sensors of the magnetic head are fabricated. The slider flies above the surface of the disks on a thin cushion of air, and the surface of the slider which faces the disks is called an Air Bearing Surface (ABS).

The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads has become progressively smaller. This decrease in track width has allowed for dramatic increases in the areal density data storage density of disks.

Recent read heads typically use a tunnel junction sensor, also known as a "tunnel valve", abbreviated "TV", for reading the magnetic field signals from the rotating magnetic data storage disk. The sensor typically includes a nonmagnetic tunneling barrier layer sandwiched between a ferromagnetic pinned layer and a ferromagnetic free layer. The pinned layer in turn is fabricated on an antiferromagnetic (AFM) pinning layer which fixes the magnetic moment of the pinned layer at an angle of 90 degrees to the air bearing surface (ABS). The tunnel junction sensor is itself typically sandwiched between ferromagnetic first and second magnetic shield layers. These first and second shield layers also serve as first and second electrical lead layers, and are electrically connected to the tunnel junction sensor for conducting a tunneling current through it. The tunneling current is preferably configured to conduct Current Perpendicular to the Planes (CPP) of the film layers of the sensor, as opposed to a sensor where a sense Current In the Planes (CIP) or parallel to film layers of the spin valve sensor. The CPP configuration is attracting more attention lately, as it can be made to be more sensitive than the CIP configuration, and thus is more useful in reading higher densities of tracks and data.

The magnetic moment of the free layer is free to rotate laterally within the layer with respect to the ABS from a quiescent or zero bias point position in response to positive and negative magnetic field signals from data bits located on the rotating magnetic disk. The sensitivity of the tunnel junction sensor is quantified as magnetoresistive coefficient dr/R where dr is the change in resistance of the tunnel junction sensor from minimum resistance to maximum resistance and R is the resistance of the tunnel junction sensor at minimum resistance.

The free layer material is very soft material, magnetically speaking, with very low coercivity, which is a measure of the minimum field strength necessary to make changes in the orientation of the magnetic domains. The free layer material necessarily must have this quality, as it is this layer's changes in magnetic alignment in response to the magnetic data bits in the data disk that leads to changes in resistance, which is how the data is read.

As referred to above, it is common practice in the prior art to pin the pinned layer by using a layer of anti-ferromagnetic (AFM) material, but this method can have disadvantages that result from the thickness of the AFM material, which is typically relatively large. This thickness of AFM material may be so great that it is as thick as the other layers of sensor material combined, and has become one of the limiting factors in the reduction of size of the read heads. Therefore, there will be great advantages to read head sensors having a pinned layer or layers which do not depend on AFM material to pin the material, i.e. that are "self-pinned", such that the sensor can dispense with the AFM layer.

There may also be improvements in performance if the net magnetic moment of the pinned layer is kept near zero, as the magnetic system will be more stable. Once the magnetic moment is near zero, the material does not have shape demagnetizing and therefore retains pinning and stability to very narrow track widths and also does not demagnetize at elevated temperatures.

In addition, there are effects known as "amp flip" in which the read head signal can flip its sign (positive to negative or vice versa) depending on the external mechanical stress caused by head/disk interaction, by electrical stress caused by electrical transients or by temperature fluctuations. Amp flip is becoming a growing problem in read sensors in which the elements are becoming so miniaturized that the superparamagnetic limit for magnetic materials is being approached.

Thus there is a need for a pinned layer or layers which do not depend on an AFM layer for the pinning effect, which is thin and does not contribute greatly to the overall read head gap thickness, which preferably has a net magnetic moment very near zero and which is robustly resistant to amp flip.

SUMMARY OF THE INVENTION

A preferred embodiment of the present invention is a magnetic head having a read sensor including a free layer, a spacer layer and a number of self-pinned layers. These self-pinned layers include interleaved layers of ferromagnetic material and non-magnetic metal. The self-pinned layers are pinned through magnetostrictive anisotropy, and preferably have a net magnetic moment which is approximately zero.

An advantage of the magnetic head of the present invention is that it includes a read head having pinned layers are self-pinned, thus requiring no AFM material layer.

Another advantage of the magnetic head of the present invention is that it includes a read head that is without an AFM material layer, so that the overall thickness of the read sensor gap may be reduced by 150 Å or 50%.

And another advantage of the magnetic head of the present invention is that it includes a read head that provides pinned layers in which net magnetic moment is very near zero, symbolized by dM=0.

A further advantage of the magnetic head of the present invention is that it includes a read head for a magnetic disk drive preferably including pinned layers having high energy barrier values which prevent amp flip.

A yet further advantage of the magnetic head of the present invention is that it includes a read head for a magnetic disk drive which is more stable at extremely small dimensions.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
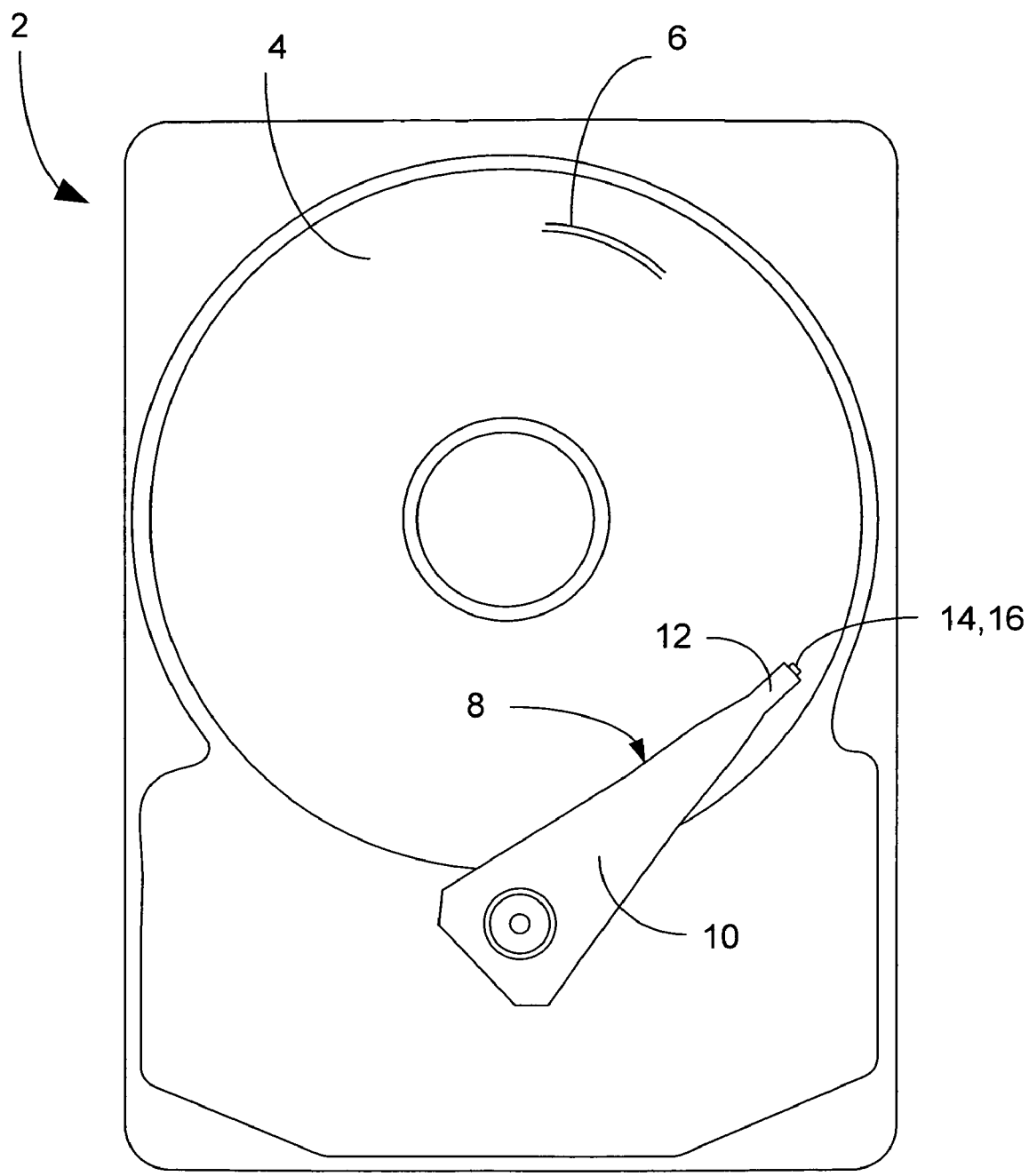
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
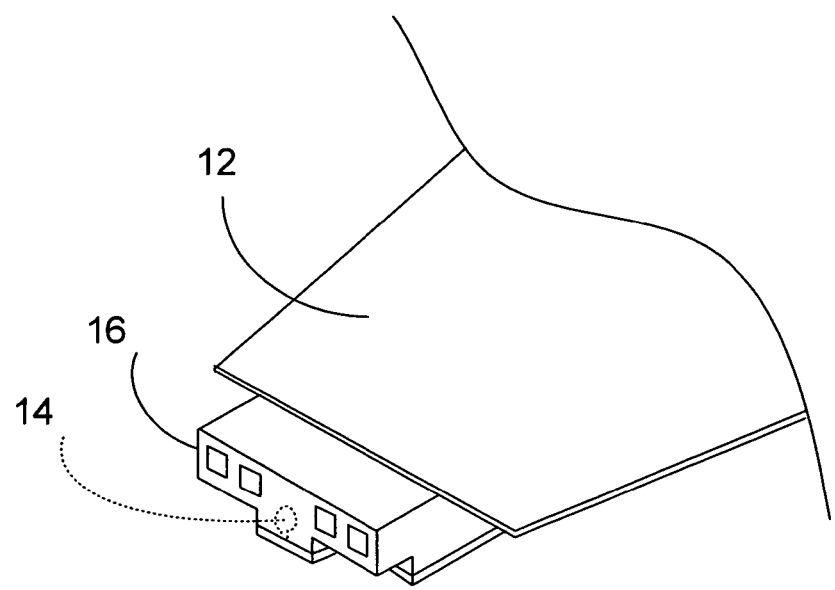
FIG. 2 illustrates a perspective view of view of an exemplary slider and suspension.
Figure 3:
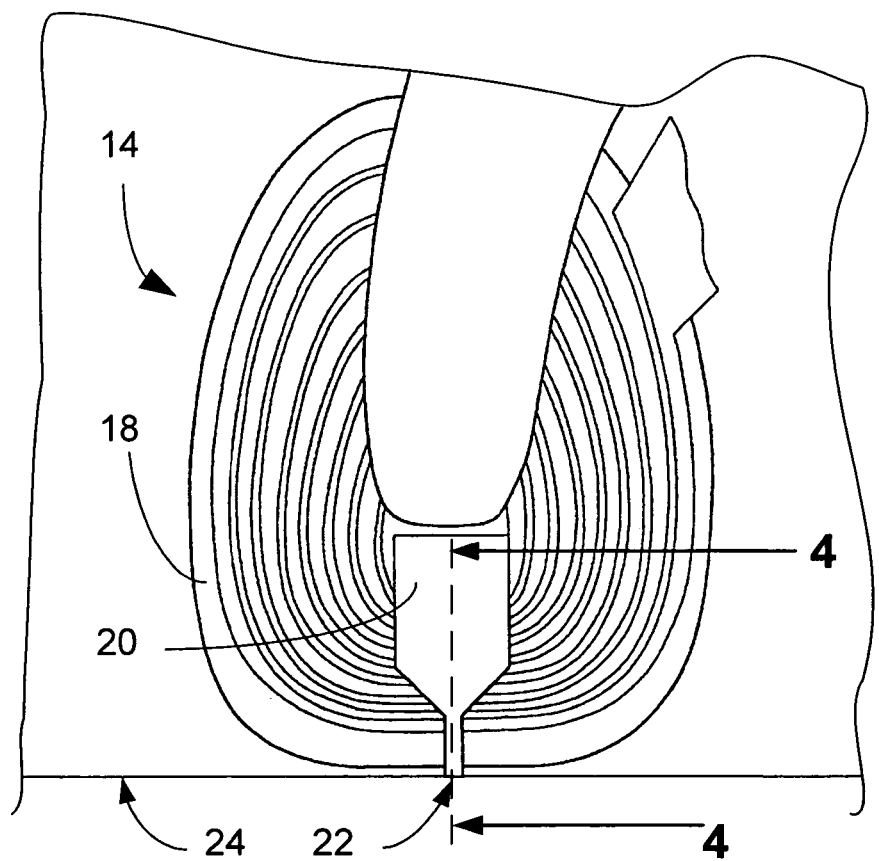
FIG. 3 shows a top plan view of an exemplary read/write head.

FIG. 2 shows a slider 16 in more detail being supported by suspension 12. The magnetic head 14 is shown in dashed lines, and in more detail in FIGS. 3 and 4. As is well known to those skilled in the art, the magnetic head 14 includes a coil 18 and a P1 magnetic pole, which also acts as an S2 shield, thus making a merged P1/S2 magnetic structure 20. The second magnetic pole P2 22 is separated from P1/S2 by write gap layer 23. In this configuration of a read head, where the sense Current is Perpendicular to the Plane (CPP) of the magnetic shield layers, shield S1 30 and P1/S2 20 act as electrodes for supplying current to the read sensor 50 which lies between them. An insulation layer 32 also separates the S1 30 and P1/S2 20 electrodes in the area behind the read sensor 50, so that they do not short out along their length.

Figure 4:
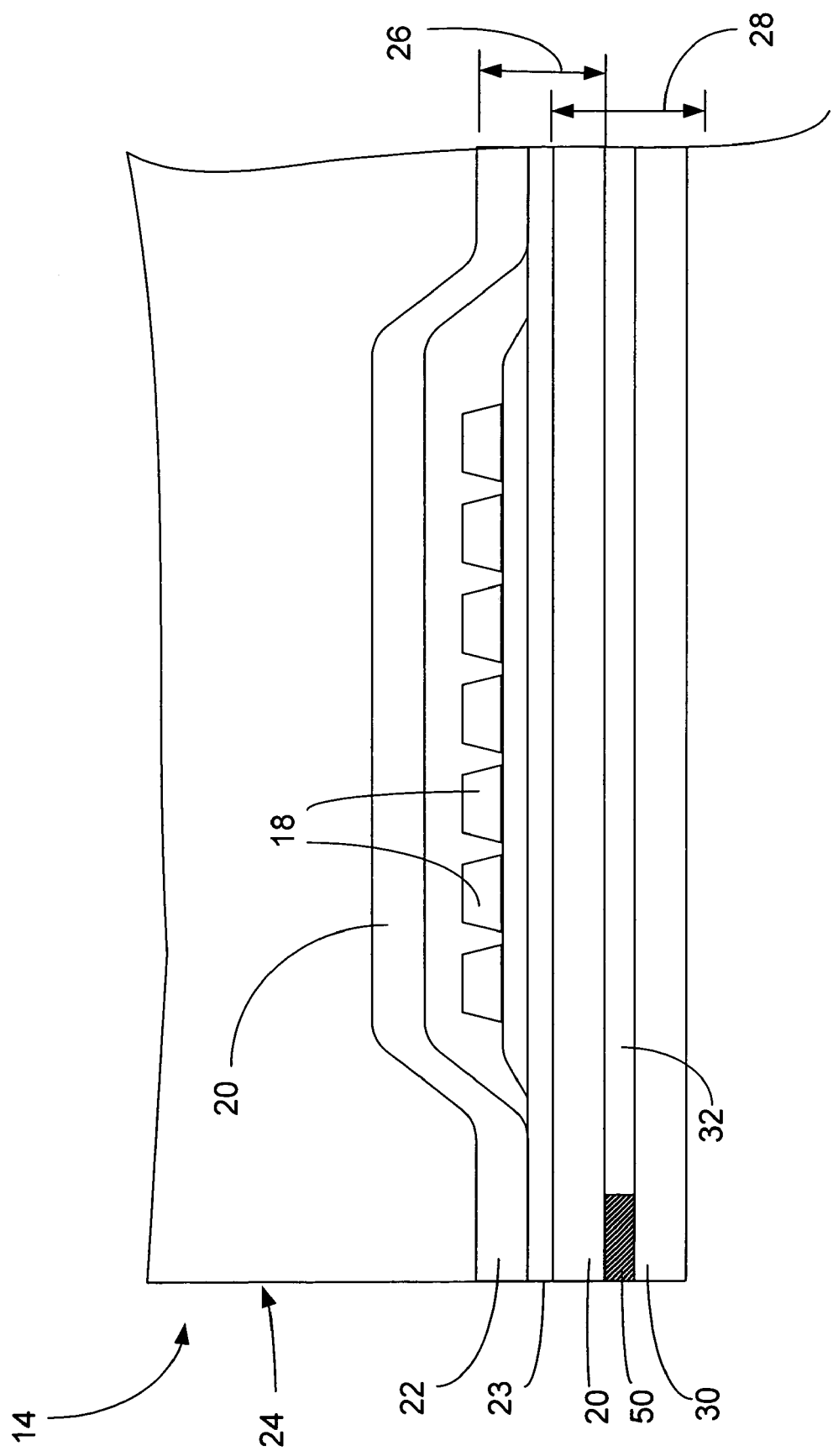
FIG. 4 is a cross-section view of an exemplary read/write head.

The magnetic head 14 flies on an air cushion between the surface of the disk 4 and the air bearing surface (ABS) 24 of the slider 16. The write head portion 26 and the read head portion 28 are generally shown in FIG. 4, along with the read head sensor 50 and the ABS 24.

In fabricating the read sensor, as referred to above, it is common practice in the prior art to pin the pinned layer by using a layer of anti-ferromagnetic (AFM) material, but this structure can have disadvantages that result from the thickness of the AFM material, which is typically large compared to the other layers. This thickness of AFM material may be so great that it is as thick as the other layers of material combined, and the AFM thickness has become one of the limiting factors in the reduction of size of the thickness of the gap between the magnetic shields of the read heads. Therefore, there will be great advantages to magnetic heads where the pinned layer or layers which do not depend on AFM material to pin them, i.e. that pinned layers are "self-pinned".

Figure 5:
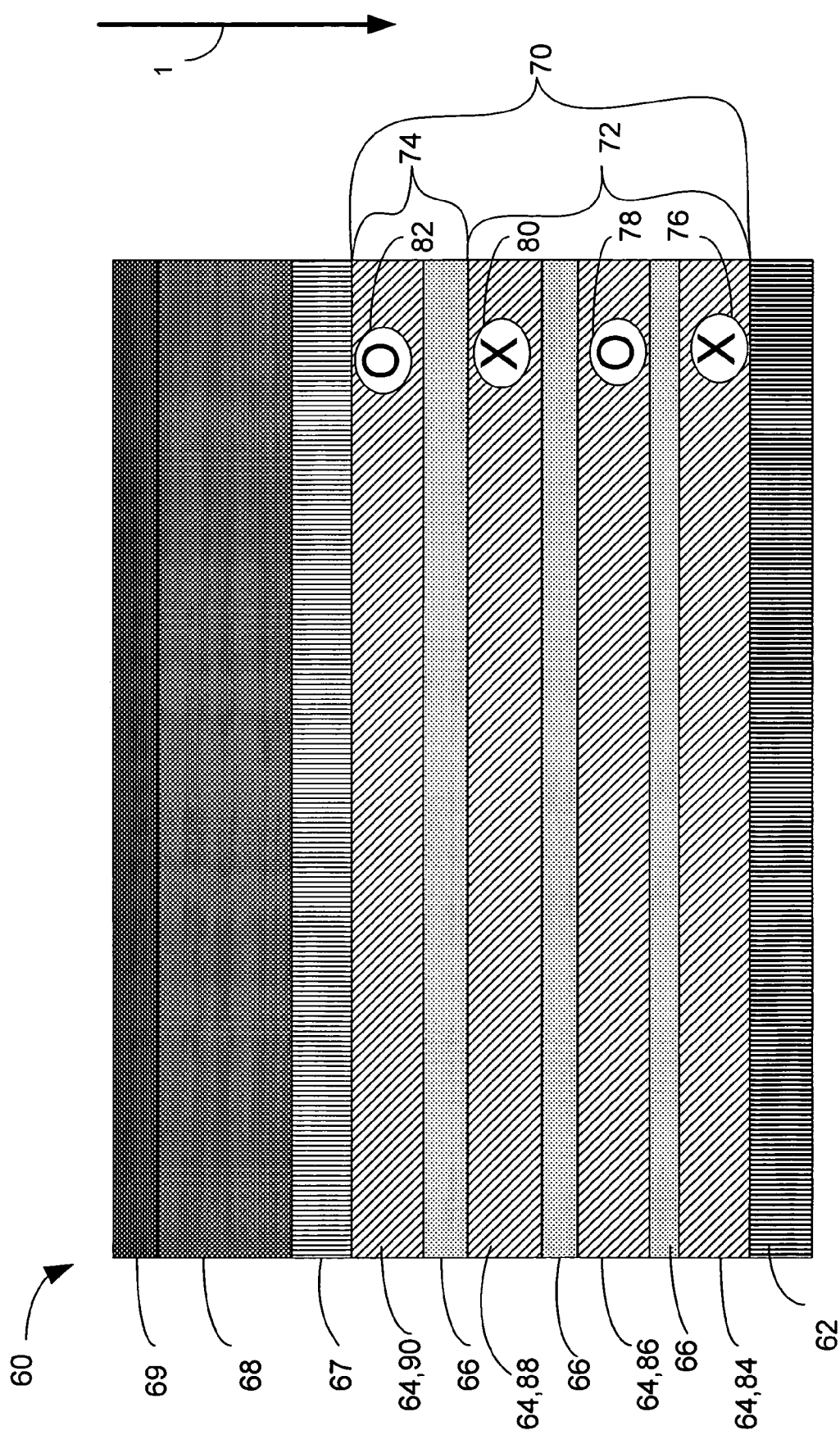
FIG. 5 is a front plan view of the structure of the read sensor as seen from the ABS.

A self-pinned read sensor 60 is shown in FIG. 5. A seed layer 62 is deposited, followed by a number of interleaved layers of ferromagnetic material 64, preferably comprised of CoFe/NiFe, Fe, or most preferred CoFe, and non-magnetic metal 66, preferably comprised of Cr, Ir, Cu, Rh, Re, and most preferred Ru. A spacer layer 67 of Cu is deposited upon the last of the interleaved layers 64, with the free layer 68, preferably comprised of NiFe, deposited on the spacer layer 67 and a cap layer 69, preferably comprised of Ta or Ru deposited on top of the free layer 68. A directional arrow B indicates the direction of current flow in a CPP (Current Perpendicular to Plane) configuration.

The interleaved layers of ferromagnetic material 64 and non-magnetic metal 66 produce an anisotropy effect, symbolized Hk, which refers to the tendency of the alignment of magnetization in material to point in certain directions in the absence of applied magnetic fields. Anistropy can be produced in several ways, including the magnetocrystalline structure of the material, but can also be produced by stress through a process called magnetostriction. The mechanism for this anisotropy is described in the Journal of Applied Physics, Vol. 91, number 5, 1 Mar. 1, 2002 (Fukuzawa et al.).

Anisotropy is produced in this configuration as mechanical stress is generated at the interface of Ru and CoFe due to a misfit between Ru and CoFe atoms. This stress then induces magnetic anisotropy through magnetostriction. The magnitude of magnetic anisotropy $Hk=3\times\lambda\times\sigma/M$, where "$\lambda$" is the magnetostriction constant of the material, "$\sigma$" is the mechanical stress, and "M" is the magnetization of the ferromagnetic material. Therefore, magnetic anisotropy can be increased either by increasing $\lambda$ or $\sigma$. Since magnetostriction $\lambda$ is a constant of the material, application of stress a is a variable which increases the overall value of HK, and this increase in anisotropy can also be thought of as if the magnetostriction constant has increased.

When the anistropy Hk increases to a certain level, the magnetic material is effectively "pinned" having the same effect as in the prior art where the pinned layer is fixed by the use of AFM material. This pinning level of Hk can be approximated by a minimum value of Hk>200 Oe, and material having this level of anisotropy will be referred to as "self-pinned material" and will be referred to by the element number 70. As discussed above, self-pinned layers 70 can dispense with the need for AFM material, thus providing a much thinner structure which contributes to the further miniaturization of the overall read head.

There may also be improvements in performance of the read head if the net magnetic moment of the pinned layers is kept near zero, as the magnetic system will be more stable. Once the magnetic moment is near zero, the material does not have shape demagnetizing and therefore retains self-pinning and stability to very narrow track widths and also does not demagnetize at elevated temperatures. The present invention preferably produces near-zero net magnetic moment as described below.

The self-pinned layer structure 70 can be thought of as having two substructures which will be referred to as AP1 72 and AP2 74. AP1 preferably includes multiple layers of ferromagnetic material 64, with each layer being roughly 5-20 Å in thickness. These are arranged in layers in which the magnetic field flux alternates in opposite directions to each other, but lie perpendicular to the plane of the paper, as shown by the directional arrows 76, 78, 80, 82, and thus are perpendicular to the ABS.

By way of example, FIG. 5 shows AP1 72 to include three ferromagnetic layers 64, which are numbered specifically as layers 84, 86, and 88, and have magnetic flux directions respectively into the paper 76, out of the paper 78, and into the paper 80, as shown. AP2 includes one ferromagnetic layer 64, specifically layer 90, which has magnetic flux direction out of the paper 82.

One method of referring to the net magnetic moment as close to zero will be to use the expression dM=0, which is achieved in this case by having the ratio of magnetic moments of AP1/AP2 having a net magnetic moment dM=0, or as a shorter notation AP1/AP2:dM=0.

In order to achieve AP1/AP2:dM=0, it is necessary that the sum of the magnetic moments of AP1 72 directed into the paper, shown by 76, and 80 for layers 84 and 88, minus the sum of the magnetic moments directed out of the paper shown by 78 for layer 86 be roughly equal to the magnetic moment of AP2 74, shown by arrow 82 for layer 90.

The same ferromagnetic material is preferably used for all ferromagnetic layers 64 of the self-pinned structure 70, so that all layers of ferromagnetic material 64 have the same magnetization M value. The magnetic moment of the layers then depends on the volume of material in the layers, and since the width and stripe height dimensions (depth into the paper) are the same for each layer in this structure, the thicknesses of the respective layers will be the significant factor in the relative magnetic moments of AP1 72 and AP2 74.

The thicknesses of the layers and the field strengths of AP1 72 and AP2 74 are thus preferably very close to each other, so that the two fields end up canceling each other out, as far as their net magnetic moment is concerned. As discussed above, this cancellation is referred to as having a net magnetic moment near zero, notated as dM=0 (which is modeled by dT<5 Å, using a quantity of "magnetic thickness, dT" as a measure, discussed below). For the purposes of this application, the term "dM=0" shall be used to indicate that the net magnetic moment is very near zero, or approximately zero, although it is to be understood that it is very difficult to make the net magnetic moment exactly equal to zero. As a way of understanding the limitations of this term, it may be useful to discuss the difference in terms of "magnetic thickness" or "dT" of these layers. For material with a certain value of magnetization M, having units of emu/cm$^3$ and of thickness of material t, having units of cm, $$\text{magnetic thickness } T = M \times t$$

thus having units of emu/cm$^2$. For 2 layers of material, or groups of layers, such as AP1 72 and AP2 74, having the same magnetization M value, the difference in magnetic thickness dT will correspond to the difference in thickness t of the layers. Thus, to achieve a dM very near zero, dT is preferred to be less than 5 Å (less than 5×10$^{-10}$ meters). For ease of reference, the term dM=0 will be used in this discussion, with the understanding that it refers back to dT<5 Å.

Referring again to the example above, the first layer 84 (magnetic field flux direction into paper 76) of AP1 72 may have a thickness of 19 Å, and the third layer 88 (magnetic field flux direction into paper 80) may have a thickness of 22 Å, for a total thickness in the direction into the paper of 41 Å for AP1 72. The second layer 86 (magnetic field flux direction out of paper 78) may have a thickness of 18 Å. Thus, the sum of net magnetic thicknesses for AP1 72=(19 Å+22 Å) (magnetic field flux out of paper)−18 Å (magnetic field flux into paper)=23 Å magnetic field flux in direction into the paper. If AP2 74 then has a thickness of 20 Å (direction out of paper 82), the total sum of net magnetic thicknesses for AP1 72 and AP2=23 Å−20 Å=3 Å. When both layers are of the same material with the same magnetic properties, then the net magnetic moment can be modeled by the difference in the layers thicknesses, i.e. 3 Å, which is thus <5 Å, and thus the net magnetic moment is very near zero, and can be modeled as dM=0.

Another consideration in design of read head sensors is that as elements are made smaller and smaller, these reductions in element size reduce the magnetic energy of the elements to near the superparamagnetic limit, whereby the elements become thermally unstable. In addition, there are effects known as "amp flip" which can affect the head output signal (amplitude) due to thermal variations and other effects. The read head signal can flip its sign (positive to negative or vice versa) depending on the external mechanical stress caused by head/disk interaction, by electrical stress caused by electrical transients or by temperature fluctuations. The present invention aims to increase the magnetic anisotropy (pinning strength) in the pinned layer to prevent pinned layer magnetization flip (reversal) so that head signal will not change its polarity. The energy required for an amp flip is a product of $$H_k \times M_s \times t \times TW \times SH$$

where Hk is anistropy, Ms is saturation magnetization, t is thickness, TW is track width (width of layers in FIG. 5) and SH is stripe height (dimension into the page in FIG. 5). Since TW×t×SH is the volume of the material and Ms is a constant of the material, Hk remains as a variable by which to increase the energy barrier to prevent amp flip. It has been found that when Hk has a minimum value of Hk>200 Oe the energy barrier is high enough for stable operation and to minimize amp flip. This produces a major advantage for this invention.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head comprising:
   a read sensor including:
      a free layer;
      a spacer layer;
      a plurality of self-pinned layers, said self-pinned layers including interleaved layers of ferromagnetic material and non-magnetic metal wherein said non-magnetic metal of said plurality of self-pinned layers is chosen from a group consisting of Ru, Cr, Ir, Cu, Rh, and Re.

2. The magnetic head of claim 1, wherein:
   said plurality of self-pinned layers includes AP1 and AP2, where AP1 includes an odd number of layers of ferromagnetic material.

3. The magnetic head of claim 2, wherein:
   said AP1 and said AP2 together have a net magnetic moment dM=0.

4. The magnetic head of claim 3, wherein:
said dM=0 corresponds to a dT less than $5\times10^{-10}$ meters, where magnetic thickness T=M×t, and M equals magnetization, t equals thickness of material, and dT is the differential in the layer thicknesses.

5. The magnetic head of claim 1, wherein:
said plurality of self-pinned layers has Hk>200 Oe.

6. The magnetic head of claim 1, wherein:
said plurality of self-pinned layers is pinned by magnetostrictive anisotropy.

7. The magnetic head of claim 1, wherein:
said ferromagnetic material of said plurality of self-pinned layers is chosen from a group consisting of CoFe, CoFe/NiFe, and Fe.

8. The magnetic head of claim 1, wherein:
said read sensor is of Current Perpendicular to the Plane (CPP) configuration.

9. A disk drive comprising:
at least one hard disk;
at least one magnetic head adapted to fly over said hard disk for writing data on said hard disk, and having an air bearing surface, said magnetic head including:
a read sensor including:
a free layer;
a spacer layer;
a plurality of self-pinned layers, said self-pinned layers including interleaved layers of ferromagnetic material and non-magnetic metal wherein said non-magnetic metal of said plurality of self-pinned layers is chosen from a group consisting of Ru, Cr, Ir, Cu, Rh, and Re.

10. The disk drive of claim 9, wherein:
said plurality of self-pinned layers includes AP1 and AP2, where AP1 includes an odd number of layers of ferromagnetic material.

11. The disk drive of claim 10, wherein:
said AP1 and said AP2 have a net magnetic moment dM=0.

12. The disk drive of claim 11, wherein:
said dM=0 corresponds to a dT less than $5\times10^{-10}$ meters, where magnetic thickness T=M×t, and M equals magnetization, t equals thickness of material, and dT is the differential in the layer thicknesses.

13. The disk drive of claim 9, wherein:
said plurality of self-pinned layers has Hk>200 Oe.

14. The disk drive of claim 9, wherein:
said plurality of self-pinned layers is pinned by magnetostrictive anisotropy.

15. The disk drive of claim 9, wherein:
said ferromagnetic material of said plurality of self-pinned layers is chosen from a group consisting of CoPe, CoFe/NiFe, and Fe.

16. The disk drive of claim 9, wherein:
said read sensor is of Current Perpendicular to the Plane (CPP) configuration.

17. A method of fabrication of a read head sensor of a magnetic head, comprising:
A) fabricating a plurality of self-pinned layers including interleaved layers of ferromagnetic material and non-magnetic metal wherein said non-magnetic metal of said plurality of self-pinned layers is chosen from a aroup consisting of Rn, Cr, Ir, Cu, Rh, and Re;
B) fabricating a spacer layer above said plurality of seW-pinned layers; and
C) fabricating a free layer on said spacer layer.

18. The method of fabrication of claim 17, wherein:
said plurality of self-pinned layers of A) have dM=0.

19. The method of fabrication of claim 18, wherein:
said dM=0 corresponds to a dT less than $5\times10^{-10}$ meters, where magnetic thickness T=M×t, and M equals magnetization, t equals thickness of material, and dT is the differential in the layer thicknesses.

20. The method of fabrication of claim 17, wherein:
said plurality of self-pinned layers has Bk>200 Oe.

21. The method of fabrication of claim 17, wherein:
said plurality of self-pinned layers is pinned by magnetostrictive anisotropy.

* * * * *